L. J. LIPPMANN.
CONTAINER.
APPLICATION FILED DEC. 2, 1920.
1,412,361. Patented Apr. 11, 1922.
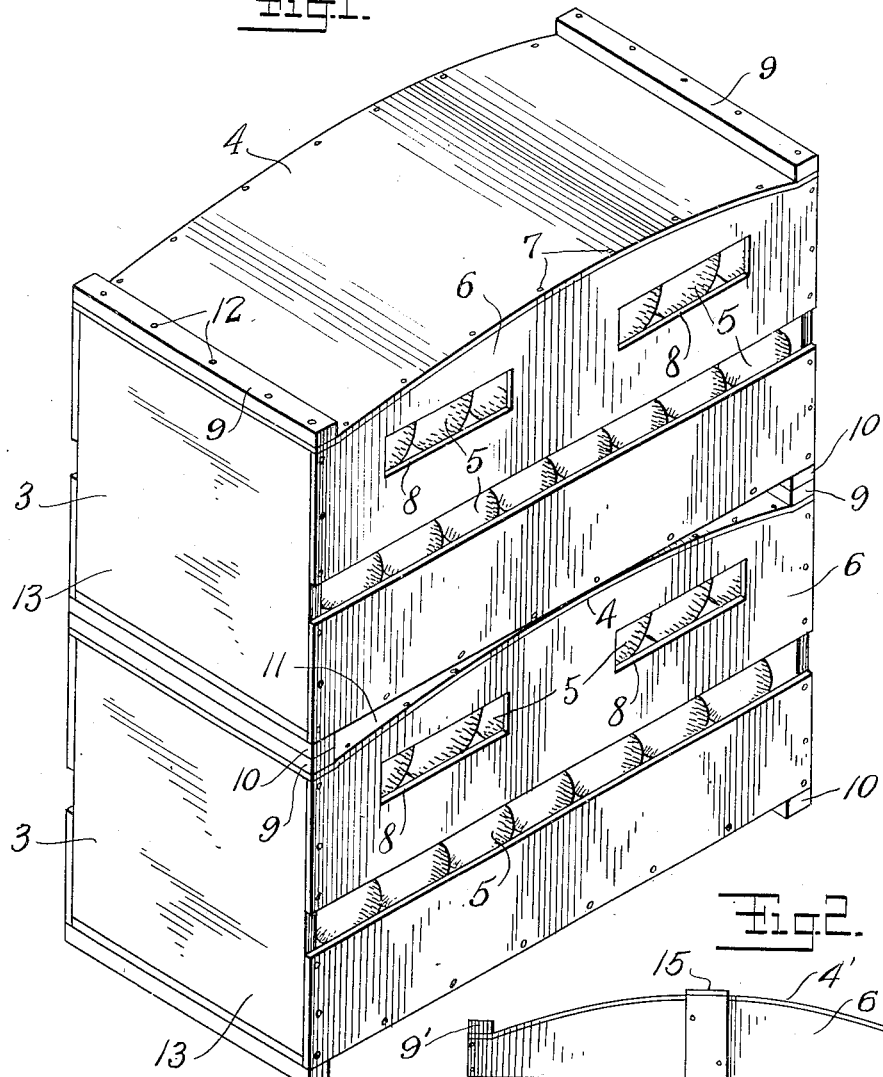
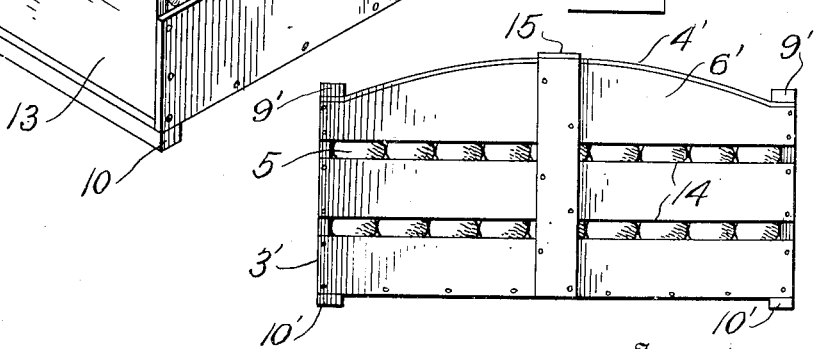
Inventor
Leopold J. Lippmann
By his Attorney
Garry P. Van Wye

UNITED STATES PATENT OFFICE.

LEOPOLD J. LIPPMANN, OF NEW YORK, N. Y.

CONTAINER.

1,412,361.

Specification of Letters Patent. Patented Apr. 11, 1922.

Application filed December 2, 1920. Serial No. 427,825.

*To all whom it may concern:*

Be it known that I, LEOPOLD J. LIPPMANN, a citizen of the United States, residing at New York, in the county and State of New York, have invented a new and useful Container, of which the following is a specification.

This invention relates to containers for fruit or vegetables; and the objects of the invention are: to provide a container with a top so constructed that it will conform to the packing of the fruit or vegetables and to provide means to protect the contents from exposure; a further object is to provide a container of this kind with supports at the end whereby one container may be stacked upon another without disturbing, or compressing the bulging top; and a still further object is to provide a container in which strengthening means are provided for the central part of the top.

The invention is illustrated in the accompanying drawing, in which—

Fig. 1, is a perspective view of two containers constructed in accordance with my invention; and, Fig. 2, is a side elevation, showing a modified form of construction.

In the drawing, like numerals of reference refer to the same parts in each of the views.

In practice I provide a container 3 provided with a bulging, or convex top 4, of a contour to conform with the usual packing of a container of this kind with fruit or vegetables 5.

It may be stated that usually in shipping fruit or vegetables they are packed in a crate, or container in a manner so that the central part of the crate is higher than the ends; then in putting on straight side slats, or boards, or slats or boards with straight edges, there is nothing to protect the fruit or vegetables from injury in shipment, or handling which are between the central part of the top and the top side board. This entails much loss as there is usually considerable space between the top and the upper side board; and much fruit and vegetables are thus left exposed. Further, in packing these containers in a car for shipment, it is usual for the packers to provide extra strips to lay between one layer of containers and the next layer to prevent the upper layer resting directly on the central part of the containers below, thereby compressing the contents. Then, too, as each top is held only at the ends, it is usual for the transportation company to require some means against the displacement of the top, or cover in shipment, such as a steel band, or other holding means.

It is the object of this invention to provide a container in which the top side slats, or boards shall have an edge of the contour of the bulging top so that no fruit or vegetables shall protrude above these side pieces. For convenience I have designated these top side slats, or boards as "guards" as they serve to protect the contents of the container from injury. In practice these guards may be wide enough to permit of securing the top to these guards. I have designated these guards with the numeral 6; and where wide enough to nail, I may secure the top to the guards with nails 7, as will be understood. I also prefer to provide the guards 6 with a plurality of ventilating openings 8.

In order that the containers may be stacked I have provided the end transverse pieces 9 at each end of the top; and similar strips, or transverse pieces 10 at each end of the bottom of each container. These strips, or transverse pieces are made of a thickness so that the combined thickness will permit of the transverse pieces 10 of one container resting upon the cross, or transverse pieces 9, of the container below with the bottom of the above container free from depressing contact with the central part of the bulging top of the lower container, as will be clear. This provides for the ventilating spaces 11 between the containers, so that air can freely circulate between the containers when packed in a car.

The cross pieces, or strips 9, and 10, also serve the purpose of making the container stronger by reason of the fact that the nails 12 may be driven through the same into the end 13 of the container.

It will thus be seen that I have provided a simple and efficient container for fruit or vegetables having great utility. By having the guards wide enough to support the edges of the bulging part of the top, especially where wide enough to receive the nails 7, it is evident that a strong container is provided thereby eliminating the necessity of securing the top on the container with straps, or other holding means.

I have thus provided a container having every means for protecting the fruit, or vegetables while providing for the shipment, and ventilation of the same.

In Fig. 2, I have shown a modified form of construction in which the container 3' is provided with a bulging top 4', and guards 6'. As a sufficient number of side slats are used to provide ventilating spaces 14 for the contents, it will be understood that ventilating openings, as 8, provided in the preferred form, need not be provided. I prefer, however, to provide a cross strip 15 to support the central part of the top; and the transverse strips 9' and 10' should be sufficient in thickness to support the containers with the bottom of the upper container free from depressing engagement with the part 15, as will be understood. This container is especially adapted for shipping tomatoes, or other contents where the least depression of the central part of the top might cause injury to the contents.

I claim:

1. A container having a bulging top, and a cross piece extending transversely of each end at both the top and bottom of said container, said cross pieces having a combined thickness at each end equal to the bulging of said top whereby the containers may be stacked without depressing the bulging top.

2. A container having a bulging top, and guards extending longitudinally of the top each having a central part adapted to engage and support the central part of said top, said guards covering a part of the sides of the container, and each guard being provided with ventilating openings, said container having a cross piece extending transversely of each end at both the top and bottom, said cross pieces having a combined thickness at each end equal to the bulging of said top whereby the containers may be stacked without depressing the bulging top.

3. A container having a bulging top, guards forming a part of said container and extending longitudinally of the top and adapted to support the central part of the same, said guards covering a part of the sides of the container, said container having a cross piece extending transversely of each end at both the top and bottom, said cross pieces having a combined thickness at each end equal to the bulging of said top with space for a cross piece whereby the containers may be stacked without depressing the bulging top, and a cross piece mounted transversely of the central part of said top, for the purpose set forth.

Dated this 1st day of December, 1920.

LEOPOLD J. LIPPMANN.